United States Patent [19]

Martinez et al.

[11] Patent Number: 4,970,250

[45] Date of Patent: Nov. 13, 1990

[54] EPOXIDIZED POLYAMIDE WET STRENGTH RESIN CONTAINING LECITHIN

[75] Inventors: Elmer D. Martinez; Thomas F. Duncan, both of Louisville, Ky.

[73] Assignee: Borden, inc., Columbus, Ohio

[21] Appl. No.: 411,704

[22] Filed: Sep. 25, 1989

[51] Int. Cl.⁵ .............................. C08L 77/06
[52] U.S. Cl. .................. 524/145; 162/164.3; 524/606; 524/607
[58] Field of Search ............ 524/145, 606, 607

[56] References Cited

U.S. PATENT DOCUMENTS

| | | | |
|---|---|---|---|
| 1,977,251 | 10/1934 | Stallman | 250/127 |
| 3,565,754 | 2/1971 | Dach's et al. | 162/164 |
| 3,694,390 | 9/1972 | Winslow | 260/29.1 |
| 3,733,290 | 5/1973 | Williams et al. | 260/29.2 N |
| 3,793,279 | 2/1974 | Lipowski | 260/29.2 |
| 3,887,510 | 6/1975 | Chan et al. | 260/29.2 |
| 3,914,155 | 10/1975 | Horowitz | 162/167 |
| 3,947,383 | 3/1976 | Baggett | 260/2 |
| 3,951,921 | 9/1976 | Espy | 260/78 |
| 4,076,896 | 3/1978 | Bunkowski | 428/530 |
| 4,267,240 | 5/1981 | Jaisle et al. | 428/484 |
| 4,501,862 | 2/1985 | Keim | 525/430 |
| 4,634,727 | 2/1987 | Kamikasada | 524/145 |
| 4,722,964 | 2/1988 | Chan | 524/608 |

OTHER PUBLICATIONS

Japanese Patent Publication JP55—139430 (Publication of Abstract) of 10/31/80 to Matsushita Elec. Works. Japanese Pat. Pub. J.P. 64—45894 (Abstract and Publication) of 2/20/89 to OJI Paper KK. Jap. Pat. Pub. JP88—057206 (English Abstract and Publication) of 11/10/88 to KOBE.

Primary Examiner—Harold D. Anderson
Attorney, Agent, or Firm—K. P. Van Wyck; D. H. Rainear; G. P. Maskas

[57] ABSTRACT

A composition comprising epoxidized polyamide wet strength resin and lecithin. The composition provides wet strength to paper and molded pulp products and at the same time increases the internal bonding of the paper or molded pulp products.

6 Claims, No Drawings

EPOXIDIZED POLYAMIDE WET STRENGTH RESIN CONTAINING LECITHIN

BACKGROUND OF THE INVENTION

1. Field of the Invention

This invention relates to epoxidized polyamide wet strength resins containing lecithin and their use in paper and molded pulp products made of cellulose fibers such as wood pulp.

2. Background and the Prior Art

In the manufacture of wet strength paper and molded pulp products, a wet strength resin is added to the pulp slurry. Wet strength resins are typically of the epoxidized polyamide, urea formaldehyde or melamine formaldehyde types. These resins provide cross-linking to impart wet strength required by various paper and molded pulp products.

During the paper or molded pulp drying process, polymers such as those of melamine formaldehyde and urea formaldehyde may become a health hazard due to release of formaldehyde. Also, the epoxidized polyamide polymers as well as the melamine formaldehyde and urea formaldehyde polymers can at times stick to hot dryer surfaces. This problem is particularly acute with the epoxidized polyamide wet strength resins in the making of molded pulp products. Thus, in the manufacture of molded pulp products, wherein melamine formaldehyde wet strength resin is used, we have found that sticking is not a problem. However, the use of epoxidized polyamide in place of the melamine formaldehyde caused undesirable sticking of resin and pulp to the drier and furthermore the internal bond strength of the dried molded pulp product was weak. Also, it appears that urea formaldehyde wet strength resins are also not as susceptible to sticking to heated drier surfaces as with the epoxidized polyamides.

The application of various release agents to paper making dryer surfaces as well as to heated platens in pressing glue coated wood particles to make panels is well known for preventing sticking of resin to such surfaces. However, such application of a surface lubricant means the addition of another process step with the consequent increase in production time as well as an additional cost due to the amount of lubricant needed. Also, for release of molded pulp products from molds, additional difficulties are encountered in application of release agents due to the contoured and curvilinear surfaces of such molds.

In the making of wood based panels such as particleboard, by using melamine formaldehyde glues, press operators have applied an emulsion of five parts of lecithin in four parts aqua ammonia of 26 Baume and 91 parts of water as a release agent on the press surfaces. Such release agent is sold by Borden, Inc. under the designator PC-803L.

U.S. Pat. No. 4,076,896 of Feb. 28, 1978, shows the manufacture of laminates by impregnating paper with a melamine formaldehyde glue containing lecithin wherein the lecithin increases the release characteristics of the resin when pressing out a panel. Japanese patent publication JP55-139430 to Matsushita Elec. Works relates to the manufacture of a laminated sheet which includes impregnating paper or cloth with a thermosetting resin containing lecithin wherein the resins are said to include phenol resins, epoxy resins, polyester resins and melamine resins. U.S. Pat. No. 4,267,240 of May 12, 1981 to Formica Corp. relates to a release sheet comprising a web of paper having one side coated with various materials including lecithin.

The Kamikaseta et al U.S. Pat. No. 4,634,727 of Jan. 6, 1987 relates to a polyvinyl acetate emulsion adhesive for bonding wood and other porous substances wherein lecithin is added directly to the adhesive emulsion or the lecithin is first emulsified with aqueous ammonia before addition to the adhesive. In this 727 patent, the lecithin is said to assist in release of the adhesive from the press platens and increases the bonding strength of the adhesive. The 727 patent states that various additional polymers may be added to the lecithin containing polyvinylacetate such as urea resin, phenol formaldehyde resin and melamine resin.

Japanese patent publication No., JP 1045894 to OJI Paper KK relates to the manufacture of paper which is said to have improved releasability by having release agents added to a layer of paper wherein the release agents include lecithin. Japanese Patent publication No. JP 88-057206 to Kobe relates to the production of a laminate by preimpregnating a paper substrate with a solution containing a surfactant and a cure accelerator for a phenolic resin varnish wherein lecithin is referred to as a cure accelerator. U.S. Pat. Nos. 1,977,251 to Stallmann of Oct. 16, 1934 and 3,947,383 to Baggett of Mar. 30, 1976 describe reaction products of ammonia and epichlorohydrin for use as a paper wet strength resin additives.

SUMMARY OF THE INVENTION

We have now found that the addition of lecithin in epoxidized polyamide wet strength resins eliminates the sticking problem encountered on the heated driers in the manufacture of paper and particularly in the manufacture of molded pulp products. The lecithin is preferably dispersed in an emulsifying or dispersing agent prior to its incorporation in the epoxidized polyamide. The epoxidized polyamide containing lecithin is added to the pulp slurry prior to forming of the molded product or paper on the wire mesh. Alternatively, each of the epoxidized polyamide and lecithin can be added separately to the aqueous pulp slurry. The addition of lecithin also improves the internal bonding of pulp in paper and molded pulp products which utilize epoxidized polyamide wet strength resins.

DESCRIPTION OF THE INVENTION

The epoxidized polyamide wet strength resins are water soluble cationic thermosetting resins. They are generally sold as aqueous solutions containing from about 10% to 35% by weight of resin solids, i.e., about 10% 35% by weight of the epoxidized polyamide. Curing of such polyamides in paper and molded pulp products on hot drying surfaces increases the wet strength of the paper or molded pulp product. Generally, sufficient wet strength resin is added so that the wet strength of the paper or molded pulp product is greater than about 15 percent of its dry strength. Wet strength is the load required to break the paper when completely wet with water. The strength measurements may include wet tensile, wet mullens (burst), and wet tear. Paper and other pulp products manufactured without any additives do not have wet strength. By the term paper, we mean to include paperboards, towling, tissue, food board, linerboard and corrugating medium. By the term molded pulp products, we mean to also include molded pulp/textile containing products. Molded pulp products are contoured products made of pulp such as egg packaging items, food trays, plates, flower pots, bottle protectors, and the like. Illustrative of molded pulp products which contain textiles, there can be mentioned contoured products such as the interior part of automobile doors, panels, etc. In contoured products, the contour is a part of the permanent shape of the article involved and such products often have surfaces which are that of compound curves.

Epoxidized polyamide wet strength resins are well known materials and their composition and method of preparation are amply described in the literature such as in the following U.S. Pat. Nos. 3,565,754; 3,733,290; 3,793,279; 3,887,510, 3,914,155; and 4,501,862. As can be seen from the above references, amides which may be reacted with epihalohydrins, e.g., epichlorohydrin, to form the polyamide wet strength resin are also referred to as polyaminopolyamides. The polyaminopolyamides are generally prepared by reacting polycarboxylic acids, or their esters with polyalkylenepolyamines such as those having two primary amine groups and at least one secondary or tertiary amine group. The polycarboxylic acids or esters thereof can be aromatic or aliphatic. The acids are generally $C_2$ to $C_{20}$ saturated aliphatic dicarboxylic acids and the esters can be formed by reacting such acids with alkanols having from 1 to about 4 carbon atoms. The polyaminopolyamides are then epoxidized to form the epoxidized polyamide wet strength resins. Some of the epoxidized polyamide wet strength resins are modified with other reactants or the starting materials for such resins are modified. Thus, the polyaminopolyamide can be reacted with other compounds such as urea or formaldehyde or the acids can be substituted such as in the case of nitrilotriacetic acid.

A preferred class of epoxidized polyamide wet strength resins are disclosed in U.S. Pat. No. 3,887,510 which issued to Chan et al on Jun. 3, 1975. In the Chan et al patent, dicarboxylic diesters derived from $C_3$ to $C_6$ saturated aliphatic dicarboxylic acids and respectively $C_1$ to $C_3$ saturated aliphatic monohydric alcohols are reacted with a polyalkylenepolyamine to prepare the polyaminopolyamide. As to the acids from which the esters are derived, there can be mentioned malonic, succinic, glutaric and adipic acids. The alcohols can be singly or in combination, methanol, ethanol, n-propanol or isopropanol. Methyl esters such as dimethyladipate and dimethylgluterate are the preferred esters.

Illustrative of suitable polyalkylenepolyamines of the Chan et al patent, there can be mentioned: diethylenetriamine; triethylenetetramine; tetraethylenepentamine; dipropylenetriamine; 4-methyldiethylenetriamine; 5-methyldipropylenetriamine; 4, 7 dialkyltriethylenetetramine; and dihexylenetriamine. The polyalkylenepolyamines of the Chan et al patent have the generic formula:

$H_2NC_nH_{2n}(NRC_nH_{2n})_xNH_2$ either $C_1$ to $C_4$ alkyl or hydrogen, x can vary from 1 to about 5 and n can vary from about 2 to 6. In some cases however it is desirable to increase the spacing of secondary amine groups and this can be done by substituting a diamine such as ethylenediamine, hexamethylenediamine and the like for a portion of the polyalkylenepolyamine. A preferred epoxidized polyamide is that made from the polyamide resulting from reaction of dimethyl gluterate and diethylene triamine.

The incorporation of lecithin in a pulp slurry containing epoxidized polyamide inhibits sticking of the wet strength resin or pulp fibers to the surfaces of the driers. Furthermore, such use of lecithin increases the bonding strength of the pulp to itself or through the action of the wet strength resin. The quantity of lecithin used in the aqueous pulp slurry to obtain the advantages of this invention varies over a broad range such as from about 0.1 percent to 15 percent or more by weight of lecithin based on the weight of the wet strength resin solids, i.e., the epoxidized polyamide. Preferably the quantity of lecithin in the pulp slurry is from about 2 to about 10 percent by weight of lecithin based on the weight of the resin solids.

A preferred composition of this invention is a stable concentrate of the wet strength resin and lecithin which can be added to the aqueous pulp slurry. Such composition contains at least 61 percent of water and comprises an aqueous solution of epoxidized polyamide wet strength resin having a solids content of from about 8 to 35 percent by weight of said composition, from about 0.1 percent to 12 percent by weight of lecithin based on the weight of said resin solids and from about 61 percent to about 92 percent by weight of water and wherein said composition has a pH of about 3 to 5. Preferably, such composition contains from about 10 percent to 30 percent by weight of said resin solids and 6 to 10 percent lecithin, based on said resin solids and 67 to about 89 percent of water. These concentrates can also contain small quantities, e.g., up to about 2 or 5% by weight based on the weight of resin solids, of various solvents, emulsifiers or dispersing agents for the lecithin.

The lecithin can be added to the aqueous pulp slurry directly or it can first be added to the wet strength resin which is subsequently added to the aqueous pulp slurry. Preferably the lecithin is incorporated in the wet strength resin, as the above described concentrate, before addition of these chemicals to the pulp slurry. Lecithin is not soluble in water. Therefor it is preferred that a solution, emulsion or dispersion of the lecithin be used. Alternatively, hydrolized lecithin can be employed or the lecithin itself can be intimately dispersed into the wet strength resin or pulp slurry such as by mixing. A preferred way for getting the lecithin into the wet strength resin or directly into the aqueous pulp slurry is by first emulsifying the lecithin in aqueous ammonia water such as an emulsion containing 5 parts lecithin, 4 parts aqua ammonia of 26 Baume and 91 parts of water.

The molded pulp products and various paper products of this invention are made by conventional techniques except that a small quantity of lecithin is used together with the epoxidized polyamide wet strength resin in the aqueous pulp slurry in making such products. Illustratively, the molded pulp products can be made by depositing pulp fibers from a slurry on to a foraminous, e.g., wire mesh, mold. There can be single or multiple molds which can be fixed or as part of a conveyer so that a continuous operation can be realized. Molds on a conveyer often involve a rotating cylinder with suitable porting connections. Wet preforms from the initial mold are often pressed to a desired thickness and then dried under restraint between matched heated dies or in an oven. The drying process will vary depending upon the density of the finished product but can vary from about 1 to about 3 minutes. The thickness of the molded pulp products can vary over a wide range such as that of about 0.1 inch to about 0.4 inch.

Briefly, in the production of various papers, including paperboard, the paper furnish, after stock preparation and proper dilution, is usually sent to the paper machine through one or more screens or other devices to remove dirt and fiber bundles. It then proceeds to a flow spreader to provide a uniform flowing stream of the width of the machine. The flow spreader discharges the slurry into a headbox, where turbulence is controlled, fiber flocculation is minimized, and the proper head is provided to cause the slurry to flow out through the slice and onto a moving wire at the proper velocity. The sheet leaving the "wet end" is pressed to remove additional water by mechanical means. At this stage, the wet sheet has reached the point where further water removal by mechanical means is not feasible and evaporative drying must be employed. The evaporative driers are generally steam heated cylinders, with alternate sides of the wet paper exposed to the hot surface as the sheet passes from cylinder to cylinder.

During the manufacture of paper or molded pulp products, several additives are introduced at the "wet end" of the process, i.e., in the pulp slurry, to give the finished products the required physical properties. One of these additives is the wet strength resin. During drying on hot surfaces, the wet end additives, including the wet strength resins, may cause residual build-up on heated dryer surfaces. This build-up will cause the molded product or paper to stick to the dryer causing dryer wrap or breaks in the case of cylinder dryers or the need for manual removal of the contoured molded product in the case of molded pulp products. The use of lecithin as set forth in this invention overcomes or minimizes these sticking or breaking problems. Additionally, the lecithin increases the strength of internal bonding in paper and molded pulp products. The percentage of dry pulp solids in the aqueous pulp slurry vary over a wide range but, initially, prior to the draining of water are on the order of about 0.5 to 5 percent of the slurry. The quantity of epoxidized polyamide to dry pulp solids in the slurry will generally vary from about 0.1% to about 5%.

In order that those skilled in the art may more fully understand the inventive concept presented herein, the following examples are set forth in the appended claims. All parts and percentages are by weight unless otherwise stated.

EXAMPLE 1

Epoxidized polyamide wet strength resin, namely Cascamid C-20, was added to a pulp slurry at a rate of 2.25% (45 pounds of wet strength resin solids per ton of dry pulp solids) to form a 0.65 gm/cm$^3$ molded pulp sheet. Cascamid C-20 is an aqueous solution of wet strength resin sold by Borden, Inc., having 20 parts of epoxidized polyamide in 80 parts of water and wherein the polyamide, prior to epoxidation is the reaction product of dimethylgluterate and diethylenetriamine. The sheets were formed in a deckel box, pressed to a thickness of 2.5 mm and dried on matching die driers at 530° F., for 2.5 minutes. Several of the sheets were observed to stick to the upper die drier as the lower one descended. The sheets also showed evidence of picking which was determined through visual observation and roughness of test specimens. In an attempt to cut specimens for testing, the sheet broke across the center internally at a place intermediate its top and bottom surfaces due to internal bond failure resulting from what was attributed to improper cure of resin and/or moisture escaping from the center.

EXAMPLE 2

Laboratory handsheets were prepared as in Example 1 above except that the resin addition level was reduced to 0.5% (10 pounds of wet strength resin solids per ton of dry pulp solids) and a contoured die disc was not used. Test samples were placed between heated press platens for drying. Upon lowering the lower plate, the specimens stuck to the upper plate and again showed bonding failure through the center of the specimen, i.e., internally in a plane intermediate its top and bottom surfaces.

EXAMPLE 3

Laboratory handsheets were prepared as in Example 2 above except that 0.1% of PC-803-L (by weight, based on the weight of resin solids in C-20) and 0.5% Cascamid C-20 (by weight, based on the weight of dry pulp solids) were each added separately to the slurry. Handsheets did not show signs of sticking or internal failure on cutting. PC-803-L is an aqueous emulsion of lecithin in ammonia. The aqueous emulsion consists of 5 parts of lecithin in 4 parts of ammonia aqua of 26 Baume and 91 parts of water and is sold by Borden, Inc. as a protective coating to be applied to platen surfaces used to make particleboard with melamine formaldehyde glues.

EXAMPLE 4

Laboratory handsheets were prepared as in Example 2 above except that 0.5% Cascamid C-20 (by weight, based on the weight of dry pulp solids) mixed with 0.1% of PC-103-L (by weight, based on the weight of wet strength resin solids) before addition to the slurry. The sheets did not show signs of sticking or internal failure. Cascamid C-20 is an aqueous solution of wet strength resin sold by Borden, Inc. having 20 parts of epoxidized polyamid in 80 parts of water and wherein the polyamide, prior to epoxidation is the reaction product of dimethylgluterate and diethylenetriamine. PC-103-L is a product sold by Borden, Inc. and referred to as a protective coating. It is composed of an aqueous emulsion of 5 parts lecithin in 4 parts of ammonia aqua of 26 Baume and 91 parts of water.

EXAMPLE 5

A mixture of Cascamid C-20 (69.32%) at 20% solids, 29.64% of PC-803L and 1.04% hydrochloric acid was applied to pulp/synthetic pulp slurry at 0.5% (10 pounds per ton) as in 1 above showed no signs of sticking nor of internal failure and had satisfactory properties with respect to percent swell, burst flexural strength and modules of elasticity. This was 10.69% lecithin by weight based on weight of the resin solids.

EXAMPLE 6

Specimens were prepared as in Example 5 above except that the resin was applied at 1% (20 pounds of resin solids per ton of dry pulp solids) and the PC-803L and hydrochloric acid were not used. The sheets stuck to drier surface and showed signs of internal failure.

EXAMPLE 7

Specimens were prepared as in Example 1 above except that the resin mixture was 69.32%, Cascamid C-25 at 25% solids, 29.64% of PC-803L and 1.04% hydrochloric acid. Specimens showed no signs of sticking or internal failure. The amount of lecithin in the PC-803L amounted to 8.6% of lecithin on the resin solids.

What is claimed is:

1. An aqueous composition comprising from about 8 percent to about 35 percent by weight of thermosetting epoxidized polyamide wet strength resin solids, from about 0.1 percent to 12 percent by weight of lecithin based on the weight of said resin solids and wherein said composition has a pH of about 3 to 5.

2. A composition of claim 1 wherein from about 10 to 30 percent of said composition is said resin solids and 6 to 10 percent by weight, based on said resin solids, is lecithin.

3. A composition of claim 1 wherein the lecithin is emulsified in ammonia.

4. A composition comprising an aqueous solution containing: from about 61% to 92% by weight of water; from about 8 to 35 percent by weight of thermosetting epoxidized polyamide wet strength resin solids, said solution having lecithin intimately admixed therein wherein the quantity of lecithin varies from about 0.1 percent to about 12 percent by weight of said resin.

5. A composition of claim 4 wherein the lecithin is emulsified in ammonia and the pH of said composition is from about 3 to 5.

6. A composition of claim 5 wherein the quantity of lecithin varies from about 6 percent to 10 percent by weight of said resin solids and the amide portion of said epoxidized polyamide is the reaction product of a diester derived from a $C_3$ to $C_6$ saturated aliphatic dicarboxylic acid and a $C_1$ to $C_3$ saturated alphatic monohydric alcohol with polyalkylene polyamines having two primary amino groups and at least one secondary or tertiary amino group.

* * * * *